Feb. 13, 1940.                H. D. ELLIS                 2,189,768
         VARIABLE COUPLING OF ELECTRICAL OSCILLATORY CIRCUITS
                          Filed Oct. 2, 1935
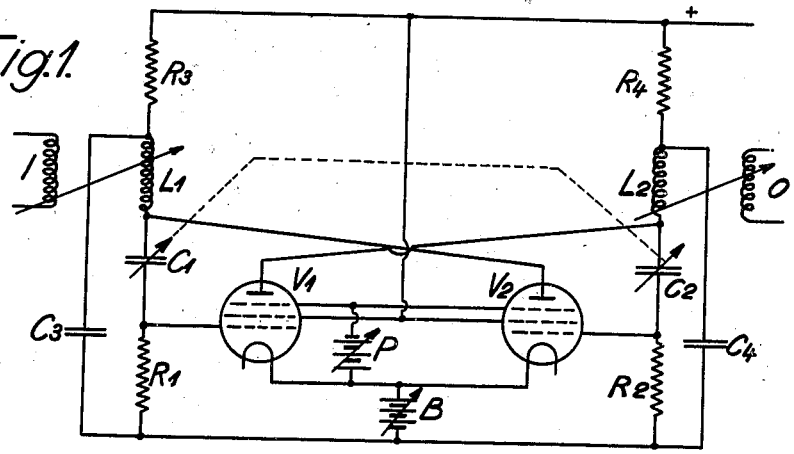
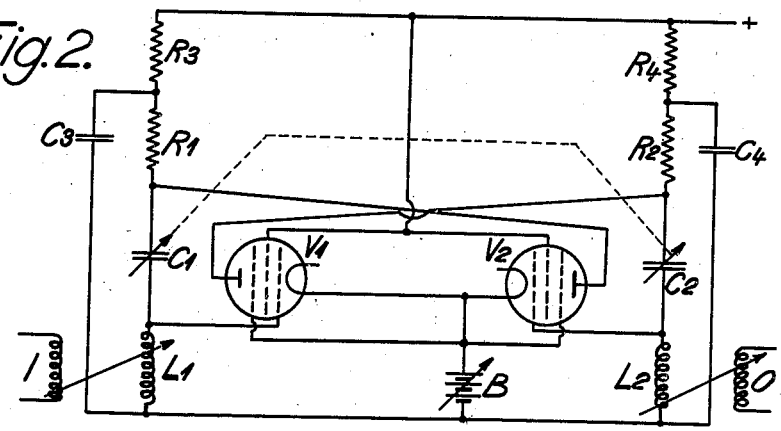
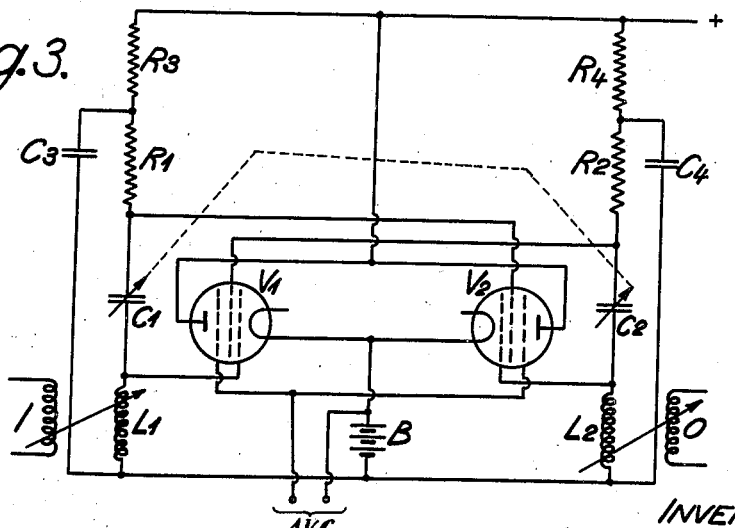
INVENTOR
Horace Dudley Ellis
BY
ATTORNEY Patented Feb. 13, 1940

2,189,768

UNITED STATES PATENT OFFICE 2,189,768

VARIABLE COUPLING OF ELECTRICAL OSCILLATORY CIRCUITS

Horace Dudley Ellis, London, England, assignor to Murphy Radio Limited, London, England, a company of Great Britain Application October 2, 1935, Serial No. 43,191
In Great Britain October 11, 1934

8 Claims. (Cl. 179—171)

As a rule oscillatory circuits are coupled directly through an impedance which may be common to both or not included in either or are coupled indirectly by an electric or magnetic field common to both, and variation of the coupling involves movement of one or more circuit elements.

The present invention is a means of coupling oscillatory circuits which permits of the coupling being varied by electrical means not involving movement of the circuit elements. According to the invention each oscillatory circuit feeds the grid of a valve the anode circuit of which includes or is coupled with the other oscillatory circuit. Thus the coupling is two directional, whatever happens in either circuit affecting the other to the same or a substantial degree. To vary the coupling provision is made for varying the gain of the valves.

A principal application of the invention is to band-pass filters such as are used in radio receivers. By its means the selectivity of the filter may be varied by mere variation of the bias of two valve grids. This makes it possible to control selectivity from a distance, or even automatically.

Various forms of connection or coupling are possible between the oscillatory circuits and the grid and anode circuits of the valves; to obtain the usual flat-topped response curve they must be such that when the oscillatory circuits are tuned to the input of the filter, the voltages across the oscillatory circuits are in quadrature.

A convenient means of coupling the oscillatory circuits to the valves is to load each circuit with a resistance and to employ that resistance and the inductance of the circuit the one for feeding the grid circuit of the one valve and the other for coupling to the anode circuit of the other valve.

Under present-day conditions of broadcasting such extreme selectivity is necessary to enable weak signals to be received when more powerful signals are being transmitted on neighbouring wave lengths that some part of the transmitted side bands has to be sacrificed. When the signals to be received are strong relatively to signals of neighbouring wave lengths such extreme selectivity is neither necessary nor desirable. As a practical approximation to what is desirable it may be said that the stronger the wanted signals the less should be the selectivity. A highly selective receiver may therefore be equipped with filter circuits coupled according to this invention, and a bias may be applied to the coupling valves dependent on the strength of the signal. In receivers equipped with automatic volume control there are already present means for obtaining a bias dependent on the signal strength, and the same means may supply the bias for the coupling valves.

For many purposes it is desirable to adjust the coupling of a filter to the "critical" value at which the resonance peaks of the two coupled circuits have just begun to separate, so that the filter gives a flat-topped response curve. This "critical" value of the coupling naturally depends on the sharpness of tuning of the oscillatory circuits; the condition for critical coupling being that the coupling, reckoned as an impedance, should be equal to the equivalent series resistance of the oscillatory circuits. It is therefore possible by varying the equivalent series resistance to keep the coupling "critical" notwithstanding variation of it for varying selectivity. The requisite variation of the resistance for this purpose may be effected by the valves which vary the coupling.

Figure 1 is a circuit which may serve as a band pass filter; Figure 2 is a modification of it convenient for automatic control; Figure 3 is a further modification facilitating the use of existing automatic volume control bias for control of selectivity.

The invention will be further explained with reference to the accompanying drawing which shows oscillatory circuits coupled to and by two valves in the above described manner.

The oscillatory circuits to be coupled consist of inductance and variable capacity L1, C1 and L2, C2 respectively, the variable capacities being usually ganged. Each circuit is loaded by a resistance, R1, R2, in series with a blocking condenser C3, C4. The circuit L1, C1 is fed from an input circuit I, and the circuit L2, C2 feeds an output circuit O.

In Figure 1 the two oscillatory circuits are coupled by placing the resistance R1 in the grid circuit of the variable mu valve V1, and the inductance L2 in the anode circuit of that valve; and correspondingly placing resistance R2 in the grid circuit of the variable mu valve V2 and the inductance L1 in the anode circuit of that valve. The anode circuits are connected with a high tension supply through impedances R3 and R4 respectively which with the condensers C3, C4 keep oscillatory currents from the high tension source. Variable bias B is applied to the grids of both valves. This may be a bias variable by hand, or a bias varied automatically with strength of signal. Additional means for varying the slope of the pentodes 1, 2 consists of a variable potential P applied to their suppressor grids.

The inductances L1, L2 may change places with the resistances R1, R2 as seen in Figure 2.

It is clear that for alternating currents the impedance of valve V2 shunts the circuit L1, C1, and the impedance of valve V1 shunts the circuits L2, C2. The effective resistance of these circuits therefore depends on the impedance of the valves. As the slope of the valves is decreased by variation of the bias B the impedance of the valve will increase, and that will tend to maintain "critical" coupling. But if the variation of impedance with slope arising from variation of the bias B is not precisely that required to maintain "critical" coupling the slope can be further varied, with a different effect upon the impedance, by means of P.

For automatic control of the coupling the connections of Figure 2 are the more convenient. A suitable bias voltage varying with signal strength for application to the control grid, or the suppressor grid, or both, may be obtained by methods well known for automatic volume control. But the bias voltage already available for automatic volume control will be found to be of the wrong sign for automatic control of coupling, for it is a negative bias increasing in numerical value as the signal strength increases. To avoid the complication of reversing the sign of the automatic volume control bias for use for coupling control, the connections of Figure 3 may be adopted. There the screen grids of the valves V1 and V2 serve as anodes for the purpose of the coupling, and the automatic volume control bias is applied to the suppressor grid. As the current in the screen grid circuit varies in the reverse sense to the current in the plate circuit the automatic volume control bias produces the desired variation of coupling; the slope of the valves, considering the screen grids as their anodes, increases as the potential of the suppressor grid is made increasingly negative.

I claim:

1. A band-pass filter of variable selectivity comprising two oscillatory circuits, two thermionic valves with circuits for supplying heating current and anode current thereto, means connecting the grids of said valves the one to the one oscillatory circuit and the other to the other, means for coupling each oscillatory circuit to the anode circuit of the valve of which the grid is fed by the other oscillatory circuit, and means for varying the slope of said valves.

2. A band-pass filter of variable selectivity comprising two oscillatory circuits, two thermionic valves with circuits for supplying heating current and anode current thereto, means connecting the grids of said valves the one to the one oscillatory circuit and the other to the other, means for coupling each oscillatory circuit to the anode circuit of the valve of which the grid is fed by the other oscillatory circuit, and means for varying the slope and impedance of said valves.

3. In a radio receiver a band-pass filter comprising two oscillatory circuits, two thermionic valves with circuits for supplying heating current and anode current thereto, means connecting the grids of said valves the one to the one oscillatory circuit and the other to the other, means for coupling each oscillatory circuit to the anode circuit of the valve of which the grid is fed by the other oscillatory circuit, and means for varying the slope of said valves in dependence on the amplitude of a received signal.

4. In a radio receiver including a thermionic amplifier and means for applying to the amplifier a bias dependent on the strength of the received signal to vary the gain of the amplifier and thereby automatically control the volume of the reproduction, a band-pass filter comprising two oscillatory circuits, two pentodes with circuits for supplying heating current and anode current thereto, means connecting the control grids of said pentodes the one to the one oscillatory circuit and the other to the other, means for coupling each oscillatory circuit to the screen grid of the pentode of which the control grid is connected to the other oscillatory circuit, and connections applying to the suppressor grids of said pentodes the bias employed for automatic volume control.

5. In a band-pass filter the combination of two oscillatory circuits with ganged tuning means, a resistance for each circuit bridged across the circuit by a blocking condenser, and two valves, the resistance and inductance of the one circuit being coupled the one to the grid circuit of the first valve and the other to the anode circuit of the second valve, while the resistance and inductance of the other circuit are coupled the one to the grid circuit of the second valve and the other to the anode circuit of the first valve, and means for varying the slope of said valves.

6. A coupling between two oscillatory circuits for transferring energy from the one to the other upon an alternating E. M. F. exciting oscillations in the first circuit, comprising two thermionic valves, means for applying to the grid of the first valve an alternating potential derived from the oscillations in the first circuit and for supplying to the second circuit energy derived from the anode circuit of the first valve, and means for supplying to the first circuit energy derived from the anode circuit of the second valve and out of phase with the exciting E. M. F. in the first circuit and for applying to the grid of the second valve an alternating E. M. F. derived from the oscillations in the second circuit.

7. A band-pass filter unit comprising two oscillatory circuits each including discrete elements across which E. M. F.'s of different phase arise on oscillations occurring in the circuits, two thermionic valves, means for connecting one element of the first circuit between the grid and cathode of the first valve and another element of that circuit between the grid of the first valve and the anode of the second, means for connecting one element of the second circuit between the grid and cathode of the second valve and another element of that circuit between the grid of the second valve and the anode of the first, and means for varying the slope of the valves.

8. A band-pass filter unit comprising two oscillatory circuits each including discrete resistive, capacitative and inductive elements, two pentode valves, connections coupling separate elements of the first circuit to the grid of the first valve and the screen grid of the second, and connections coupling separate elements of the second circuit to the control grid of the second valve and the screen grid of the first.

HORACE DUDLEY ELLIS.